(12) United States Patent
Cazenave et al.

(10) Patent No.: US 9,272,786 B2
(45) Date of Patent: Mar. 1, 2016

(54) CIRCUIT FOR SUPPLYING OXYGEN TO AIRCRAFT PASSENGERS

(75) Inventors: Jean-Michel Cazenave, Seyssins (FR); Jean Dehayes, Lumbin (FR); Didier Gaget, Sassenage (FR); Stéphane Lessi, Newark, DE (US); Nicolas Schmutz, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 1822 days.

(21) Appl. No.: 10/565,712

(22) PCT Filed: Jul. 21, 2004
(Under 37 CFR 1.47)

(86) PCT No.: PCT/FR2004/050348
§ 371 (c)(1),
(2), (4) Date: Jan. 22, 2007

(87) PCT Pub. No.: WO2005/016750
PCT Pub. Date: Feb. 24, 2005

(65) Prior Publication Data
US 2007/0144597 A1    Jun. 28, 2007

(30) Foreign Application Priority Data
Aug. 4, 2003   (FR) ...................... 03 50394

(51) Int. Cl.
*B64D 11/00* (2006.01)
*B64D 25/00* (2006.01)
*A62B 7/14* (2006.01)

(52) U.S. Cl.
CPC ............. *B64D 11/00* (2013.01); *B64D 25/00* (2013.01); *A62B 7/14* (2013.01); *B64D 2231/02* (2013.01); *Y02T 50/46* (2013.01); *Y10T 137/6906* (2015.04)

(58) Field of Classification Search
CPC .................................................. B64D 2231/02
USPC ............... 137/505, 899.2, 487.5; 128/202.11, 128/204.29, 205.25; 454/74, 75, 76
See application file for complete search history.

(56) References Cited

U.S. PATENT DOCUMENTS 4,163,387 A * 8/1979 Schroeder .................... 73/178 R
4,164,899 A * 8/1979 Burgess .......................... 454/72

(Continued)

FOREIGN PATENT DOCUMENTS

EP    0 394 076    10/1990
EP    0 448 258    9/1991

(Continued)

OTHER PUBLICATIONS

International Search Report for PCT/FR2004/050348.

*Primary Examiner* — John Fox
(74) *Attorney, Agent, or Firm* — Christopher J. Cronin

(57) ABSTRACT

The invention relates to a circuit for supplying oxygen to aircraft passengers. According to the invention, the line (5) used to supply pressurized oxygen to the passenger masks (6) comprises a motorized pressure regulator (8) which can be actuated in response to a pressure control signal (10) provided by an electronic control unit (9) according to a signal (11) that is representative of the cabin pressure (12).

4 Claims, 1 Drawing Sheet

(56) References Cited

U.S. PATENT DOCUMENTS

| | | | |
|---|---|---|---|
| 4,553,474 A * | 11/1985 | Wong et al. ............... | 454/74 |
| 4,648,397 A * | 3/1987 | Beale ..................... | 128/205.11 |
| 4,651,728 A * | 3/1987 | Gupta et al. ............. | 128/201.28 |
| 4,827,964 A * | 5/1989 | Guido et al. ............. | 137/81.1 |
| 5,186,681 A * | 2/1993 | Emmons .................. | 454/74 |
| 5,261,457 A | 11/1993 | Zapata et al. | |
| 5,520,578 A * | 5/1996 | Bloch et al. ............. | 454/74 |
| 5,701,889 A * | 12/1997 | Danon ..................... | 128/204.29 |
| 5,809,999 A * | 9/1998 | Lang ....................... | 128/200.24 |
| 6,003,543 A * | 12/1999 | Sulatisky et al. ......... | 137/487.5 |
| 6,588,442 B2 * | 7/2003 | Babin ...................... | 137/1 |
| 6,935,593 B2 * | 8/2005 | Meckes et al. ........... | 244/118.5 |
| 6,979,257 B2 * | 12/2005 | Horner et al. ............ | 454/74 |
| 7,588,032 B2 * | 9/2009 | Cannon ................... | 128/205.14 |

FOREIGN PATENT DOCUMENTS

| | | |
|---|---|---|
| EP | 0 499 505 | 8/1992 |
| GB | 793 452 | 4/1958 |
| GB | 865 084 | 4/1961 |

* cited by examiner

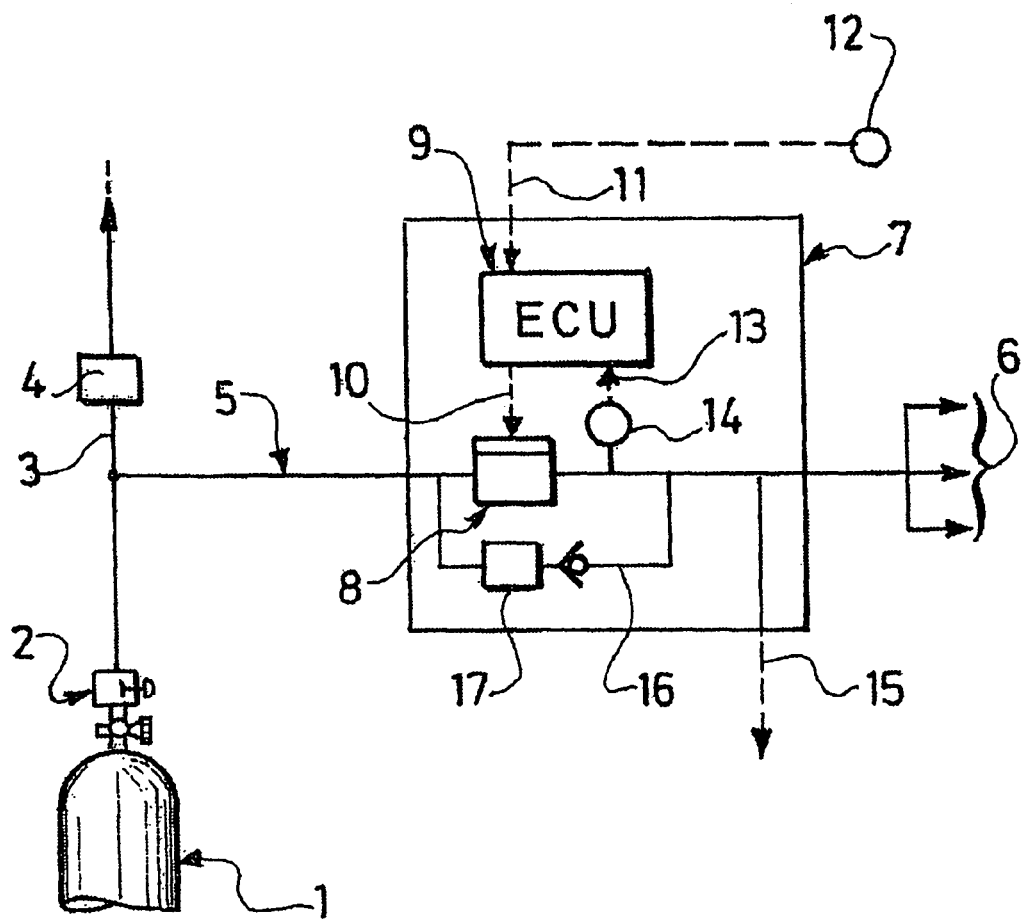

CIRCUIT FOR SUPPLYING OXYGEN TO AIRCRAFT PASSENGERS

The present invention relates to circuits for supplying oxygen to aircraft passengers in case of cabin decompression.

Aeronautics regulations (for example FAR) require, in commercial aircraft, the presence of an emergency oxygen system for passengers that can deliver a predetermined pure oxygen flow to each passenger according to the altitude of the aircraft in case of accidental cabin decompression.

Currently available systems use a calibrated hole determining the oxygen flow rate supplied to the passenger mask, a pneumatic pressure reducer, sensitive to the ambient pressure, regulating the oxygen pressure upstream of the calibrated orifices.

These purely pneumatic systems have poor accuracy and response times, giving rise to the supply of oxygen with a flow rate higher than the minimum regulation flow rate required, entailing the need to carry oversized oxygen tanks, which affect the commercial performance of the aircraft.

Moreover, these systems, which require many pipes and fittings, are sources of potential leaks, and demand lengthy and difficult maintenance operations.

It is the object of the present invention to propose a simple, efficient circuit for supplying oxygen, eliminating most of the above drawbacks, in particular concerning the load carried, and offering greater safety.

For this purpose, according to one feature of the invention, the circuit comprises, in a line supplying oxygen connected to a pressurized oxygen source, a servocontrolled pressure regulator that can be actuated in response to a pressure control signal supplied by an electronic control unit.

According to a more particular feature of the invention:
the circuit comprises a cabin pressure sensor delivering an absolute pressure signal to the electronic control unit for the generation of the control signal of the regulator.

Other features and advantages of the invention will appear from the following description of one embodiment, provided for illustration but nonlimiting, in relation to the appended drawing, in which:

the single FIGURE shows schematically an oxygen supply circuit according to the invention.

The single FIGURE shows a pressurized oxygen tank, in this case, a cylinder 1 containing oxygen under a nominal pressure of between 120 and 200 bar, provided with a pressure reducer 2 delivering oxygen at a gage pressure of typically between 5 and 8 bar to a line 3, comprising a pressure regulator 4, for supplying oxygen to the crew, and at least to a line 5 supplying oxygen to the masks 6 of the cabin passengers.

According to one aspect of the invention, a regulation unit 7 is inserted into the line 5, essentially comprising a servocontrolled solenoid valve 8, controlled, according to external parameters, by an electronic control unit 9.

More precisely, the servocontrolled valve 8 is advantageously of the type of that described in document EP-A-499 505 (Arnault/Zapata), in the name of the Applicant, of which the content is incorporated here for reference, capable of regulating the pressure downstream of the line 5 by following a setpoint signal 10 generated by the electronic control unit 9 particularly according to a cabin pressure signal 11 provided by an absolute pressure sensor 12, and also a regulated pressure signal 13 provided by a pressure sensor 14 in the line 5 downstream of the regulator 8.

Advantageously, the valve 8 can be locked at least temporarily in the closed position, automatically and/or manually, isolating the passenger circuit to the masks 6 in order to assign oxygen supply priority from the cylinder 2 to the crew line 3.

Depending on the choice of the aircraft manufacturer and/or operator, the electronic control unit 9 can also trigger the opening of the boxes of the passenger masks 6. Similarly, a connection 15 can be provided downstream of the regulator 8 for independently supplying oxygen to an onboard oxygen therapy system, particularly to assist patients with breathing problems.

In the embodiment shown in the FIGURE, the unit 7 comprises a bypass line 16 provided with a safety solenoid valve 17 for shortcircuiting the regulator 8 in case of failure thereof.

As previously mentioned, the system according to the invention permits the accurate monitoring of the minimum flow rates imposed by the regulatory standards, according to the various altitudes reached by the aircraft, thereby avoiding systematic oxygen overconsumption and hence allowing the size or number of the oxygen cylinders 1, and hence their weight, to be reduced.

The system according to the invention serves to reduce the number and length of the oxygen pipes, and hence the risk of leaks, particularly in the cabin, while moreover facilitating their accommodation in the fuselage structures.

Since the connections between the sensors, the electronic control units and the regulator 8 are exclusively electrical, their monitoring and tracking are considerably easier, thereby avoiding arduous maintenance operations and particularly regular disassembly.

Although the invention has been described in relation to particular embodiments, it is not limited thereto but susceptible to modifications and variants that will appear to a person skilled in the art in the context of the claims below.

The invention claimed is:

1. A circuit for supplying oxygen to aircraft passengers of an aircraft having a cabin in case of accidental cabin depressurization, comprising:
   a pressurized oxygen tank;
   a first line fluidly communicating with the tank for supplying oxygen to a plurality of aircraft passenger masks;
   a first pressure sensor adapted to measure an absolute pressure in the cabin;
   a servocontrolled pressure regulator;
   an electronic control unit;
   a second pressure sensor disposed in the first line downstream of the pressure regulator that is adapted to measure the pressure in the first line downstream of the pressure regulator, wherein the pressure regulator is adapted to regulate the pressure in the first line downstream of the pressure regulator by following a setpoint signal generated by the electronic control unit according to a cabin pressure signal received by the electronic control unit from the first pressure sensor and also according to a regulated pressure signal received by the electronic control unit from the second pressure sensor.

2. The circuit of claim 1, further comprising a second line fluidly communicating between portions of the first line upstream of the pressure regulator and downstream of the second pressure sensor that bypasses the pressure regulator, the second line including a safety solenoid valve for shortcircuiting the pressure regulator in case of failure of the pressure regulator.

3. The circuit of claim 1, further comprising an oxygen therapy system fluidly communicating with the first line downstream of the second pressure sensor.

4. The circuit of claim 1, further comprising a third line fluidly communicating with the tank for supplying oxygen to aircraft crew masks in the cabin.

\* \* \* \* \*